Patented Nov. 12, 1940

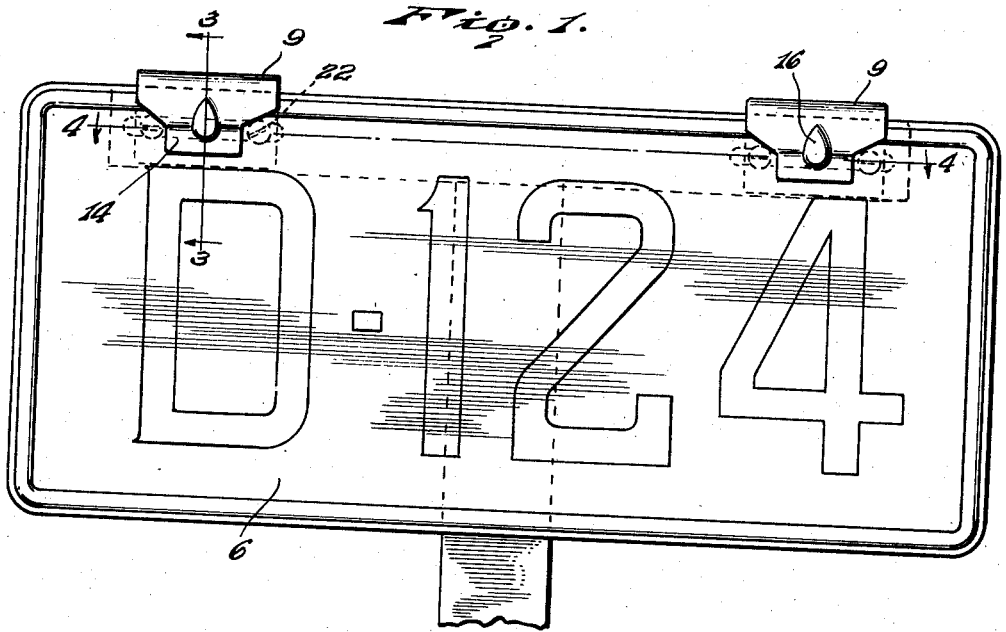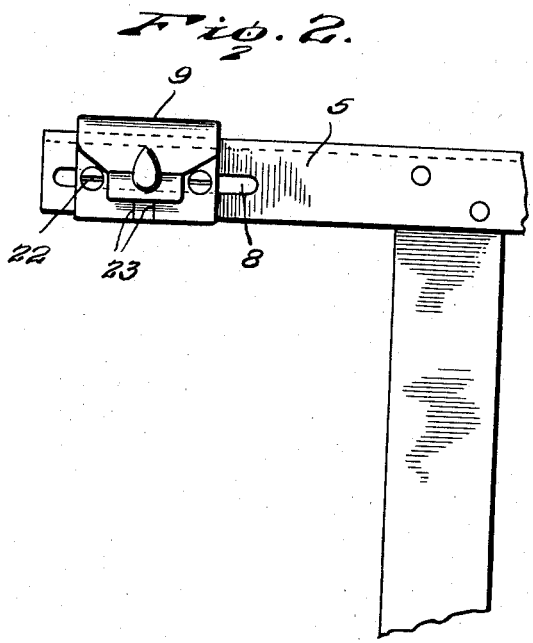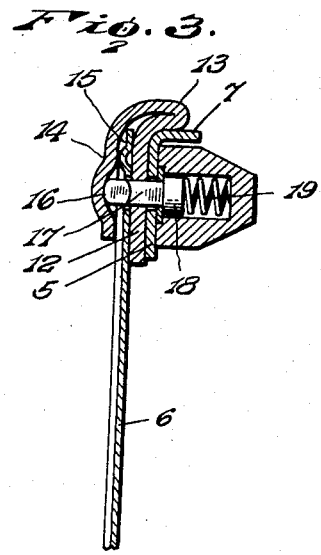

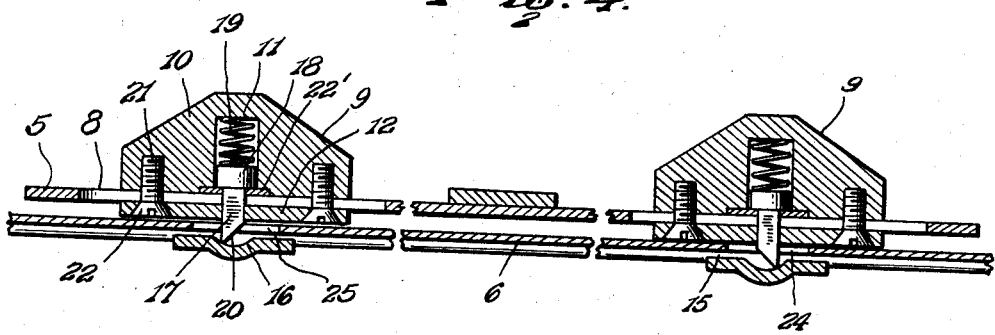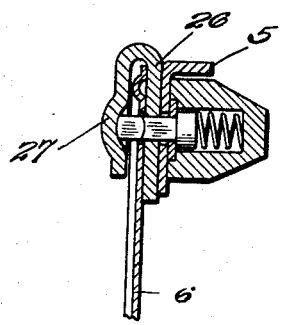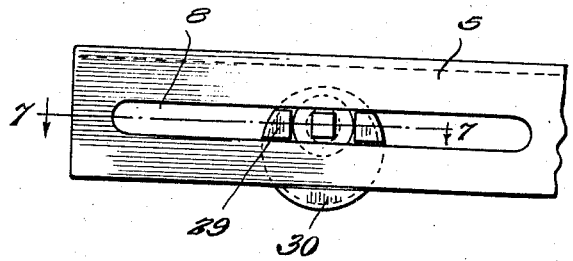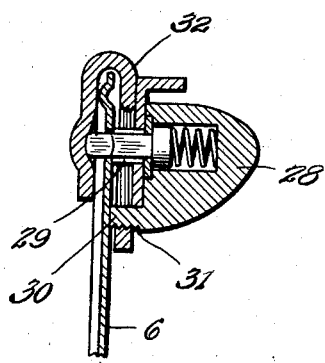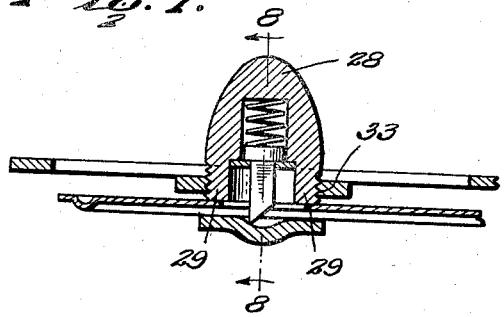

2,221,503

UNITED STATES PATENT OFFICE 2,221,503

LICENSE PLATE HOLDER

Fred J. Zimowske, Mio, Mich.

Application July 31, 1939, Serial No. 287,665

9 Claims. (Cl. 40—125)

This invention relates to automobile license plate holders, and has for its object to provide a comparatively simple and inexpensive device of the character described, the construction of which is such that, after the license plate has been attached to the supporting bracket of an automobile or other motor driven vehicle, it cannot be removed therefrom without mutilating or otherwise rendering the license plate unfit for further use.

A further object of the invention is to provide a license plate holder including spaced securing members having means for attachment to a supporting bracket and provided with spring pressed locking pins adapted to enter slots in a license plate for preventing loss of the license plate or removal and use thereof by an unauthorized person.

A further object is to provide the securing members with attaching screws, the heads of which are covered and protected by the license plate when the latter is in position on the supporting bracket so as to prevent surreptitious removal of said attaching screws in an attempt to detach the license plate and unlawfully use the same.

A still further object of the invention is generally to improve this class of devices so as to increase their utility, durability and efficiency as well as to reduce the cost of manufacture.

In the accompanying drawings forming a part of this specification and in which similar numerals of reference indicate corresponding parts in all the figures of the drawings:

Figure 1 is a front elevation of a license plate holder embodying the present invention, Figure 2 is a similar view of one portion of the supporting bracket with the license plate removed therefrom, Figure 3 is a vertical sectional view taken on the line 3—3 of Figure 1, Figure 4 is a horizontal sectional view taken on the line 4—4 of Figure 1, Figure 5 is a vertical sectional view illustrating a modified form of the invention, Figure 6 is a front elevation illustrating a further modification, Figure 7 is a horizontal sectional view taken on the line 7—7 of Figure 6, and Figure 8 is a vertical sectional view taken on the line 8—8 of Figure 7.

The improved license plate holder forming the subject-matter of the present invention is especially designed for securing license plates on supporting brackets of automobiles and other motor driven vehicles, and in Figure 1 of the drawings, a standard supporting bracket 5 is shown, on which is mounted a license plate, indicated at 6. The supporting bracket 5 is provided at its upper edge with a laterally extending flange 7, and at each end of the bracket are the usual longitudinal adjusting slots 8.

The device comprises spaced securing members 9 each consisting of a body portion 10 having an opening 11 formed therein preferably cylindrical in cross section and opening through the face of the body portion 10, as best shown in Figure 4 of the drawings. Each securing member 9 is secured to the adjacent portion of the supporting bracket 5 by means of a face plate 12 having its upper end bent upon itself to form an overhanging rib 13 which bears against the flange 7 of the supporting bracket 8, the plate, after the rib 13 is formed, being extended downwardly to form a depending lip 14 spaced from the main body of the plate 12 to form an intermediate chamber 15 adapted to receive the license plate 6. The inner face of the lip 14 is pressed laterally to form a socket 16 adapted to receive the adjacent end of a locking pin 17. The inner end of the locking pin 17 is provided with an enlarged cylindrical head 18 which is slidably received within the opening 11, and interposed between the head 18 and the adjacent end of the opening 11 is a coiled spring 19, the purpose of which is to normally hold the pin in extended position. The free end of the pin is provided with an inclined or beveled face 20 adapted to enter the adjacent socket 16 for the purpose of locking the license plate in position on the supporting bracket. The free ends of the pins 17 are preferably inclined or beveled in opposite directions, as best shown in Figure 4 of the drawings, so as to facilitate positioning the license plate on the supporting bracket and prevent removal of said license plate without mutilating or otherwise rendering the plate unfit for further use, as will be more fully explained hereinafter. The face plate 12 is secured to the body portion 10 by spaced screws 21, the heads 22 of which are preferably counter-sunk in said plate so as to firmly grip the bracket 5 and also to provide a smooth surface for contact with the license plate. The plate 12 of each securing member is preferably provided with spaced depressions 23, the purpose of which is to assist in properly positioning the securing members on the supporting bracket to correspond with the position of the openings in the license plate.

In using the device, one end of the license plate is inserted within the chamber 15 between the face plate 12 and the depending lip 14, and as said end of the plate contacts with the beveled face 20 of the adjacent locking pin, it will force the pin rearwardly against the tension of the spring 19 so as to hold the pin in retracted position until the slot 24 in the license plate registers with the pin when the spring 19 will force the beveled end of the locking pin within the socket 16. The other end of the license plate 6 is then inserted within the chamber 15 of the other securing member and moved longitudinally thereof until the slot 25 moves past the adjacent pin and, during this movement, the end of the plate, by engagement with the inclined face 20 of said pin, will depress the same and hold said pin in depressed position until the slot 25 in the license plate is caused to register with the pin when said pin will enter the socket in said securing member. The length of the slots 24 and 25 in the license plate are such as to permit longitudinal adjustment of the plate so as to allow the locking pins to enter the sockets in the securing member. By reference to Figure 4 of the drawings, it will be noted that the inclined or beveled faces 20 of the locking pins face each other while the flat straight outer surfaces of the pins face outwardly with the result that should an attempt be made by an unauthorized person to remove the license plate from the supporting bracket by exerting a longitudinal pull on one end of the plate one of said flat faces of said pin will prevent removal of the plate, and, if a longitudinal pull is exerted on the other end of the plate, the flat surface of the other pin will prevent removal of the license plate. If an excessive pull or pressure is exerted on the license plate in an attempt to remove the same from the supporting bracket, the pointed ends of the locking pins will cut or mutilate the license plate so as to render it unfit for further use. It will be noted that, when the license plate is in position on the supporting bracket, said license plate will cover and protect the heads 22 of the screws 21 so that it would be impossible for a person to remove the screws 21 in an attempt to detach the license plate with a view to unlawfully using the same. In order to prevent accidental displacement of the locking pin 17, I provide a locking key or washer 22' which fits within a counter-sunk portion in the adjacent face of the body portion 10 and bears against the head 18 of the pin, as shown.

In Figure 5 of the drawings, there is illustrated a modified form of the invention, in which the overhanging head of the securing member is dispensed with, the plate 26 of said securing member being extended upwardly beyond the supporting bracket 5 a short distance and then extended downwardly to form the depending lip 27, the construction and operation of the device being otherwise similar to that shown in Figures 1 to 4 inclusive of the drawings.

In Figures 6 to 8 inclusive, there is illustrated a further modification. In this form of the device, the body portion 28 is provided with spaced inwardly projecting lugs 29 which extend through the slot 8 in the supporting bracket 5 and is further provided with a third lug 30 which extends beneath and bears against the supporting bracket 5. The lugs 29 and 30 are provided with exterior threads 31, and the face plate 32 of the securing member is provided with an opening 33, the walls of which are threaded for engagement with the threads on the lugs 29 and 30 so that by rotating the face plate 32 the parts will be securely clamped together without the employment of independent screws or similar fastening devices. It will be noted that in all forms of the device the securing members are provided with locking pins which engage sockets in depending lips formed on the adjacent face plate of the device so as to automatically lock the license plate in position on the supporting bracket and prevent removal of said license plate without mutilating or otherwise damaging said plate to such an extent as to render it unfit for further use. While I have shown the securing members disposed in spaced relation on the upper portion of the supporting bracket, it will, of course, be understood that these securing members may be fastened to the lower portion of the supporting bracket if desired without departing from the spirit of the invention. It will also be understood that the securing members may be made in different sizes and shapes and as many of said securing members employed for holding the license plate on the supporting bracket as found desirable or necessary.

A license plate holder constructed in accordance with the present invention is not only inexpensive and easy to operate but will positively prevent a person from removing a license plate from its supporting bracket without mutilating said license plate and will, therefore, prevent unlawful removal and use of the license plate by a person other than the owner thereof.

Having thus described the invention, what is claimed as new is:

1. A license plate holder including a supporting bracket, spaced securing members mounted on the bracket and each provided with a depending lip having a socket therein, and spring pressed locking pins slidably mounted in the securing members and provided with beveled ends adapted to extend through openings in a license plate and enter the adjacent sockets, the beveled ends of the pins extending in opposite directions.

2. A license plate holder including a supporting bracket, spaced securing members mounted on the bracket and each provided with an opening and formed with a depending lip having a socket therein, locking pins slidably mounted in the openings and provided with beveled ends, and springs interposed between the locking pins and the adjacent walls of said openings for normally holding the pins in extended position, the beveled ends of said pins being adapted to extend through slots formed in a license plate and enter the sockets in the adjacent lips.

3. A license plate holder including a supporting bracket, spaced securing members mounted on the bracket and each provided with an opening and a depending lip having a socket formed therein, locking pins having enlarged heads slidably mounted in the openings in the securing members, a retaining device bearing against one side of each enlarged head, and a spring bearing against the other side of each head, the terminals of said pins having inclined faces adapted to extend through slots in a license plate and enter the sockets in the adjacent lips of said securing members.

4. The combination with a supporting bracket, of spaced securing members mounted on the bracket, a face plate forming a part of each securing member and provided with a depending lip having a socket therein, screws extending through the plates and engaging the adjacent securing member, a license plate normally covering the heads of the screws and having slots formed therein, and spring pressed locking pins slidably mounted within the securing members and provided with beveled ends extending through openings in the face plates and the slots in the license plate for engagement with the adjacent sockets.

5. In a license plate holder, the combination with a supporting bracket having spaced slots formed therein, of securing members mounted on the supporting bracket, a face plate forming a part of each securing member and provided with a depending lip having a socket therein, screws extending through each face plate and the adjacent slot in the supporting bracket for engagement with said securing members, and spring pressed locking pins slidably mounted in the securing members and adapted to extend through slots in a license plate for engagement with the adjacent sockets.

6. The combination with a supporting bracket having a laterally extending flange and provided with spaced slots, of securing members mounted on the bracket and each including a body portion having an opening therein, a face plate secured to the body portion of each securing member and having its upper portion bent laterally to form a rib bearing against the flange of the supporting bracket and terminating in a depending lip having a socket therein, screws extending through each face plate and the adjacent slot in the supporting bracket for engagement with the body portion, a license plate having slots therein, and spring pressed locking pins slidably mounted in the openings in the securing members and adapted to extend through the slots in the license plate for engagement with the adjacent sockets, said license plate being interposed between the depending lips and face plates and extending over the heads of the screws.

7. In a license plate holder, the combination with a slotted supporting bracket, of a securing member mounted on the bracket and comprising a body portion, a face plate secured to the body portion and provided with a depending lip having a socket therein, fastening devices extending through the face plate and slot in the bracket and engaging said body portion of the securing device, and a spring pressed locking pin slidably mounted in the body portion and provided with a beveled end adapted to extend through a slot in a license plate for engagement with the socket in said lip.

8. The combination with a slotted supporting bracket, of a securing device mounted on the bracket and comprising a body portion having an opening therein, a face plate fitted to said body portion and provided with a depending lip having a socket therein, screws extending through the face plate and the slot in the bracket and engaging the body portion, a license plate fitting between the face plate and lip and covering the heads of the screws, and a spring pressed locking pin slidably mounted in the opening in the body portion and provided with a beveled end portion extending through the face plate and a slot in the license plate for engagement with the socket in the lip.

9. In a license plate holder, the combination with a slotted supporting bracket, of a securing member mounted on the bracket and provided with spaced threaded lugs extending through the slot in the bracket and a threaded lug bearing against the lower edge of said bracket, a face plate having a threaded opening therein engaging the threads on said lugs and provided with a depending lip, the inner face of which is formed with a socket, and a spring pressed locking pin slidably mounted on the securing member and adapted to extend through a slot in a license plate for engagement with the socket in the lip.

FRED J. ZIMOWSKE.